United States Patent [19]

Echte et al.

[11] 4,427,826

[45] Jan. 24, 1984

[54] PROCESS FOR THE CONTINUOUS PREPARATION OF RUBBER-MODIFIED POLYMERS OF VINYLAROMATICS

[75] Inventors: Adolf Echte, Ludwigshafen; Hermann Gausepohl, Mutterstadt; Hermann P. Hofmann, Frankenthal; Hans Mittnacht, Weinheim, all of Fed. Rep. of Germany

[73] Assignee: BASF Aktiengesellschaft, Fed. Rep. of Germany

[21] Appl. No.: 273,689

[22] Filed: Jun. 15, 1981

[30] Foreign Application Priority Data

Jun. 25, 1980 [DE] Fed. Rep. of Germany ....... 3023721

[51] Int. Cl.$^3$ ............................................. C08F 279/02
[52] U.S. Cl. ....................................... 525/53; 525/261
[58] Field of Search .................................. 525/53, 261

[56] References Cited

U.S. PATENT DOCUMENTS

| | | | |
|---|---|---|---|
| 3,243,481 | 3/1966 | Ruffing et al. | 260/880 |
| 3,428,712 | 2/1969 | Carrock et al. | 260/880 |
| 3,903,204 | 9/1975 | Carter et al. | 260/880 R |
| 3,914,339 | 10/1975 | Shima et al. | 260/880 R |
| 4,098,847 | 7/1978 | Stevenson | 525/261 |
| 4,282,334 | 8/1981 | Walter | 525/53 |

*Primary Examiner*—Paul R. Michl
*Attorney, Agent, or Firm*—Keil & Witherspoon

[57] ABSTRACT

A process, carried out without a diluent or in solution, in more than 2 reaction zones, for the continuous preparation of rubber-modified polymers of vinylaromatics, wherein a monomeric aromatic vinyl compound and an elastomeric polymer, in an amount of from 3 to 16% by weight based on the monomer, are polymerized, in the absence of a free radical initiator, but in the presence of a mercaptan as a chain transfer agent, at from 80° to 180° C. in a first reaction zone, with stirring, up to a maximum monomer conversion, $U_{max}$, given by the equation $$U_{max} = K - 1$$

where K is the amount of rubber in % by weight based on monomer, and, in a second reaction zone, polymerization is continued, with stirring, to a conversion of up to about 50% by weight, after which a chain transfer agent is introduced in an amount of from 0.01 to 0.2% by weight, based on vinyl-aromatic monomer, and polymerization is continued, if appropriate in more than one reaction zone, up to a monomer conversion of less than 85% by weight. The polymer is treated in a devolatilization zone to remove vinyl-aromatic monomer and solvent, if any, and these constituents are recycled to the process. The process produces products which exhibit good gloss coupled with good mechanical properties, and which can be employed for conventional applications.

2 Claims, No Drawings

PROCESS FOR THE CONTINUOUS PREPARATION OF RUBBER-MODIFIED POLYMERS OF VINYLAROMATICS

The present invention relates to a continuous process for the preparation of rubber-modified polymers of vinylaromatics. The process is carried out in the absence of a free radical initiator and in the presence of a mercaptan as a chain transfer agent.

The relevant prior art includes (1) U.S. Pat. No. 3,903,202, (2) U.S. Pat. No. 3,243,481, (3) U.S. Pat. No. 3,914,339 and (4) U.S. Pat. No. 3,428,712.

The continuous polymerization of high-impact polystyrene in two, three or more reaction zones has been known for a long time [cf. (1) or (2)]. It is also known that chain transfer agents, eg. nitroso-containing compounds or mercaptans, may be used to adjust the molecular weight [cf. (1), (2) and (4)]. (3) furthermore proposes that the chain regulator be added after a certain conversion, which is from 3.5 to 15% by weight, has been reached.

According to the teaching of (3), the polymerization is initially carried out as a mass polymerization, in the absence of an initiator. After the chain transfer agent has been added, polymerization is continued to a conversion of 20–40% by weight, and thereafter the reaction is completed in a third stage, in the presence of lauroyl peroxide. The process described gives products having high gloss and containing small rubber particles. However, the disadvantage of the known process is that a substantial proportion of low molecular weight polymers are formed; the latter lower the softening point of the finished product and tend to exude on processing. Furthermore, these low molecular weight constituents lower the impact strength if little or no initiator is used [cf. (3)]. On the other hand, however, the initiator concentrations employed in (3) lead to uncontrollable reactions if a continuous mass polymerization or solution polymerization is carried out.

It is an object of the present invention to provide a continuous polymerization process which obviates the use of initiators and nevertheless gives products having good gloss and containing small rubber particles, without this being at the expense of the mechanical properties.

We have found that this object is achieved, surprisingly, if the chain transfer agent is introduced after the second process stage and if furthermore the reaction is not taken to complete conversion but is, instead, stopped before then. This surprising effect was in no way foreseeable, especially since (4) recommends that the reaction be taken to the highest possible conversion.

Accordingly, the present invention relates to a process for the continuous preparation of a rubber-modified polymer of a vinylaromatic, wherein a mixture which contains one or more monomeric aromatic vinyl compounds and from 3 to 16% by weight, based on monomers, of one or more elastomeric polymers consisting principally of polymerized 1,3-diene units, with or without a solvent, is polymerized, in the absence of a free radical initiator but in the presence of a mercaptan as a chain transfer agent, at from 80° to 180° C., (a) in a first process stage, with stirring, up to a maximum conversion $U_{max}$, based on monomer or monomers, given by the equation $$U_{max} = K - 1$$

where K is the amount of rubber in % by weight, based on monomer or monomers, (b) is then polymerized further, in a second process stage, with stirring, to a conversion of up to about 50% by weight, and (c) is then polymerized further, in one or more additional process stages, after which the polymer is treated in a devolatilization zone to remove vinylaromatic monomers and solvents, if any, and these constituents are recycled to the process, wherein the chain transfer agent is introduced after the second process stage (b), in an amount of from 0.01 to 0.2% by weight, based on vinyl-aromatic monomer, and the polymerization in process stage or stages (c) is taken to a monomer conversion of less than 85% by weight.

The continuous preparation of rubber-modified polymers of vinylaromatics has been adequately described, especially in (2) (cf. the kettle-tower cascade principle), so that reference may be made to this publication for details concerning the method of carrying out the continuous process.

Suitable aromatic vinyl compounds for the process according to the invention are styrene and its derivatives, eg. α-methylstyrene, o-, m- and p-methylstyrene, 2,4-dimethylstyrene and tert.-butylstyrene. Styrene is preferred.

The elastomeric polymer, consisting principally of polymerized 1,3-diene units, does not have to conform to any special requirements. Both natural and synthetic polybutadienes may be used, as well as polyisoprene rubbers, styrene-butadiene block copolymers of the SB type, and three-block copolymers of the BSB or SBS type. Diene rubbers which contain about 10% by weight of 1,2-vinyl units, or high-cis grades, with more than 96% by weight of the cis-structure, are particularly preferred.

The process according to the invention can be carried out in the absence of a diluent or in solution. In the case of mass polymerization, the rubber is dissolved in the vinyl-aromatic monomer to be polymerized, and the polymerization is then started. Suitable solvents are toluene, xylene, ethylbenzene, methyl ethyl ketone and tetrahydrofuran. The amount of solvents used is from 2 to 15% by weight, based on monomer or monomers. Ethylbenzene, used in the stated amounts, is a particularly preferred solvent.

Suitable chain transfer agents for the process according to the invention are the conventionally used mercaptans of 1 to 14 carbon atoms; tert.-dodecylmercaptan has proved particularly suitable. The amount of mercaptan is as a rule from 0.01 to 0.2% by weight, based on vinyl-aromatic monomer. Within this range, the exact amount depends on the desired melt flow of the polymers to be prepared. For technical reasons, such as accuracy of dosing, and ease of mixing-in, it is advantageous if the chain transfer agent is not employed in the pure form but as a solution in a solvent, such as toluene, ethylbenzene, xylene or methyl ethyl ketone, or together with a lubricant, such as paraffin oil or butyl stearate, or as a mixture with a small amount of the monomer. If the regulator is introduced in the first stage of the process, the surface roughness of articles produced from the polymers is excessive, and the gloss inadequate. Accordingly, the regulator must be added after the first process stage, and in particular should not be added before the conversion has reached 20% by weight. Where the process is carried out in more than two stages, it is preferred to introduce the regulator in the third process stage. In two-stage processes, such as are described, for example, in (1), the regulator is of course introduced into the second stage; however, this is only useful if the conversion in the first stage is greater than 20% by weight.

The method of carrying out the first and all subsequent process stages is known to a skilled worker, who also knows that stirring in the second process stage is critical. Equally, the temperatures to be used in the various process stages are familiar to a skilled worker. Taking all the process stages, the polymerization temperatures lie within a range of from 80° to 180° C. In the drying stage or devolatilization stage, even higher temperatures are used.

It is essential that the final conversion in the second stage, or in a further stage, depending on whether the process employs two or more stages, is restricted to less than 85% by weight, based on monomer. This conversion proves to be critical in the process according to the invention; whilst higher conversions would be desirable per se, the mechanical properties of the polymers obtained become substantially less good. The conversion can be easily calculated from the solids content, which in turn can be determined by methods familiar to a skilled worker. For example, a sample can be taken, in which the unconverted monomer is determined titrimetrically, or from which the monomer can be evaporated off after stabilization with a polymerization inhibitor, and the residue determined gravimetrically.

The product properties referred to in the Examples and Comparative Experiments were measured as follows:

1. Yield stress in accordance with DIN No. 53,455
2. Tensile strength according to DIN No. 53,455
3. Melt index according to DIN No. 53,735
4. Mean particle size by counting on electron micrographs.
5. Gloss by means of a Dr. Lange Multiflex galvanometer. For this purpose, the products obtained were injection-molded at 260° C., and the relative reflectance from the surface of these moldings was measured as a percentage of the incident light. The standard used was filter paper, having a reflectance of 0%.

The Examples and Comparative Experiments which follow illustrate the invention. All parts and percentages are by weight, unless stated otherwise.

EXAMPLE 1

A mixture of 7.2 parts of a polybutadiene containing 98% of cis-units, 85.7 parts of styrene, 6 parts of ethylbenzene and 0.1 part of octadecyl 3-(3',5'-ditert.-butyl-4'-hydroxyphenyl)-propionate was polymerized thermally in a 2-kettle 2-tower cascade. The throughput was 4 liters/hour. The stirring speeds and temperatures employed in the individual reactors, and the cumulative conversions obtained, are shown in Table 1. In the third reactor, 0.02% by weight, based on styrene, of tert.-dodecylmercaptan, dissolved in paraffin oil, was introduced continuously into the polymer stream. After polymerization, the mixture obtained was freed from solvent and residual monomer in a devolatilization zone at 220°–240° C. The properties of the product obtained, together with those of the products from Comparative Experiments 1 and 2, are shown in Table 2.

COMPARATIVE EXPERIMENT 1

Example 1 was repeated, except that the chain transfer agent was introduced continuously into the first process stage. In Table 2, the properties of the product obtained are compared with those of the product of Example 1. It is seen that the yield stress, tensile strength and gloss are greatly reduced if the chain transfer agent is introduced into the first process stage (a).

COMPARATIVE EXPERIMENT 2

7.78 parts of polybutadiene, 85.12 parts of styrene and 7.1 parts of solvent were polymerized continuously, by the method described in Example 1, with the difference that in the fourth process stage the polymerization was only stopped when the conversion was 92%. The conversions at the various stages were:

| Reactor | Conversion (%) |
|---|---|
| Kettle 1 | 4.3 |
| Kettle 2 | 22.2 |
| Tower 1 | 53.4 |
| Tower 2 | 92.0 |

The properties of the product obtained are shown in Table 2. It is seen, on comparison with the products according to the present invention, that increasing the conversion reduces the toughness.

TABLE 1

| Position | Stirring speed [rpm] | Temperature [°C.] | Conversion (cumulative) |
|---|---|---|---|
| 1st stirred reactor | 100 | 104 | 3.8 |
| 2nd stirred reactor | 160 | 132 | 20.3 |
| 1st tower | 15 | 101 | 55.3 |
| 2nd tower | 3 | 127 | 84.3 |
| Devolatilization | — | 250 | — |

TABLE 2

| | Example 1 | Comparative Experiment 1 | Comparative Experiment 2 |
|---|---|---|---|
| Yield stress [N/mm$^2$] | 27.3 | 22.6 | 26.8 |
| Tensile strength [N/mm$^2$] | 22.5 | 19.1 | 21.7 |
| Notched impact strength [kJ/m$^2$] | 10.5 | 10.4 | 8.5 |
| Melt index (5/200) [g/10'] | 3.0 | 2.6 | 3.9 |
| Mean particle size [μm] | 1.2 | 3.5 | 1.4 |
| Gloss (reflectance) [%] | 51.4 | 22.6 | 47.8 |

We claim:

1. A process for the continuous preparation of a rubber-modified polymer of a vinylaromatic, wherein a mixture which contains one or more monomeric aromatic vinyl compounds and from 3 to 16% by weight, based on monomers, of one or more elastomeric polymers consisting principally of polymerized 1,3-diene units, with or without a solvent, is polymerized, in the absence of a free radical initiator but in the presence of a mercaptan as a chain transfer agent, at from 80° to 180° C., (a) in a first process stage, with stirring, up to a maximum conversion $U_{max}$, based on monomer or monomers, given by the equation $$U_{max} = K - 1$$

where K is the amount of rubber in % by weight, based on monomer or monomers,
(b) is then polymerized further, in a second process stage, with stirring, to a conversion of from about 20 to about 50% by weight, and
(c) is then polymerized further, in one or more additional process stages, after which the polymer is treated in a devolatilization zone to remove vinylaromatic monomers and solvents, if any, and these constituents are recycled to the process, wherein the chain transfer agent is introduced after the second process stage (b), in an amount of from 0.01 to 0.2% by weight, based on vinyl-aromatic monomer, and the polymerization in process stage or stages (c) is taken to a monomer conversion of less than 85% by weight.

2. The process of claim 1 wherein the final monomer conversion is about, but less than, 85% by weight.

* * * * *